United States Patent
Jakoby et al.

(10) Patent No.: US 6,868,734 B2
(45) Date of Patent: Mar. 22, 2005

(54) SENSOR FOR RECOGNITION OF SEAT OCCUPANCY

(75) Inventors: Bernhard Jakoby, Vienna (AU); Michael Arndt, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/416,404

(22) PCT Filed: Aug. 17, 2002

(86) PCT No.: PCT/DE02/03034

§ 371 (c)(1), (2), (4) Date: Oct. 23, 2003

(87) PCT Pub. No.: WO03/024749

PCT Pub. Date: Mar. 27, 2003

(65) Prior Publication Data

US 2004/0069075 A1 Apr. 15, 2004

(30) Foreign Application Priority Data

Sep. 12, 2001 (DE) .......................... 101 44 877

(51) Int. Cl.[7] ................................................ G01B 7/16
(52) U.S. Cl. .......................................... 73/781; 72/768
(58) Field of Search ....................... 73/760, 763, 768, 73/772, 781

(56) References Cited

U.S. PATENT DOCUMENTS

| | | | | | |
|---|---|---|---|---|---|
| 3,917,936 A | * | 11/1975 | Reader | ....................... | 708/813 |
| 4,019,365 A | * | 4/1977 | Woo | ......................... | 374/46 |
| 4,456,084 A | * | 6/1984 | Miller | ....................... | 177/141 |
| 4,545,239 A | * | 10/1985 | Himmler et al. | .............. | 73/146 |
| 4,634,969 A | * | 1/1987 | Edlin et al. | ................... | 324/95 |
| 5,315,364 A | * | 5/1994 | Arion et al. | .................. | 356/32 |
| 5,717,657 A | * | 2/1998 | Ruffa | ......................... | 367/131 |
| 5,986,357 A | * | 11/1999 | Myron et al. | ............... | 307/116 |

FOREIGN PATENT DOCUMENTS

| | | |
|---|---|---|
| DE | 197 40 732 | 3/1999 |
| DE | 199 59 276 | 6/2001 |
| EP | 0 419 047 | 3/1991 |
| WO | WO 99/39168 | 8/1999 |

* cited by examiner

Primary Examiner—Max Noori
(74) Attorney, Agent, or Firm—Kenyon & Kenyon

(57) ABSTRACT

A sensor for seat-occupancy detection is located in a seat and configured as a passive sensor. This then allows a wireless querying of the sensor using a high-frequency pulse. The sensor is configured as an acoustic surface-wave component or as an LC resonant circuit.

8 Claims, 2 Drawing Sheets

SENSOR FOR RECOGNITION OF SEAT OCCUPANCY

FIELD OF THE INVENTION

The present invention relates to a sensor for seat-occupancy detection.

BACKGROUND INFORMATION

PCT Published International Application No WO 99/39168 discusses a pressure-sensitive surface sensor in which a signal is emitted by pressure-sensitive elements which are located in a vehicle seat, as a function of a pressure exerted on a seat by, for instance, a seated person.

SUMMARY

A sensor for seat-occupancy detection according to an example embodiment of the present invention may provide that, owing to a wireless querying of the sensor by a control device and the passive implementation of the sensor, an exchange of the sensor is made possible while the querying electronics are able to be retained. Passive is to be understood here as meaning that the sensor includes no power sources of its own, but must use the received energy to also retransmit the sensor information again. This means it is a passive transceiver.

Moreover, this sensor is robust and cost-effective since no energy supply has to be provided in the vehicle seat.

Especially in the case of removable seats, such as those in sports-utility vehicles (SUV's), no expensive data and/or energy transmission from the chassis to the seat needs to be provided. Furthermore, the sensor according to the present invention represents a robust and cost-effective system since no active elements are included in the sensor according to the present invention.

The sensor may be configured as a passive sensor. This means that the sensor itself includes no energy supply and obtains the energy required for performing the measurement solely through the electrical energy received. At the same time, this energy is then also used again to emit the measuring result. For this reason, appropriate filters are provided in the sensor according to the present invention, or the antenna of the sensor is tuned to the receiving and transmitting frequency in a corresponding manner. It is also possible to use more than one antenna. In a further example embodiment, the antenna is configured especially for a high-frequency signal.

Moreover, the sensing element of the sensor may be configured as an acoustic surface-wave element, i.e., a SAW (Surface Acoustic Wave sensor). These sensors may be used to perform the passive wireless query. Especially by using an interdigital structure, that is, an interdigital transducer, and by using a delay line, in this case a wireless acoustic delay line, as well as a reflector which is also configured as an interdigital transducer, for instance, a realization possibility is described for the sensor according to the present invention.

Wirelessly readable resonators may be used, particular LC resonators, which have a planar configuration. Such sensors are made up of a resonant circuit formed by a coil and a capacitor, which are applied on a ceramic board in thick-film technology, for example.

Moreover, the sensor may include a field of sensing elements. It is possible to either provide a common antenna or for different sensing elements to each include their own antenna, so that a pressure profile of the vehicle seat is able to be queried. This may be realized in particular by tuning the individual antennas to different frequencies. But other encoding measures for addressing the individual sensing elements are possible here as well since the recording of a pressure profile by the sensing elements may allow broader conclusions to be made about the occupancy of a seat, which may be used to differentiate among objects and persons and for classifying persons.

Moreover, a control device may be provided for the sensor according to the present invention which includes an antenna for emitting the query and receiving the signal. Here, too, it is possible to use more than one antenna. In addition, the control device according to the present invention also includes a master/slave station which emits a query pulse in the high-frequency range in response to a signal from the processor of the control device. The sensor according to the present invention then receives this query pulse.

Finally, a device for seat-occupancy detection may be provided which includes both the sensor according to the present invention and also the control device according to the present invention.

DETAILED DESCRIPTION

The present invention may provide seat-occupancy sensors for different applications, for instance for controlling a control device for a restraining arrangement, which is required in the event of a crash. Increasingly, vehicles including removable seats are used as well, so that a wireless transmission or a line-conducted connection to the seat is necessary in order to provide the electronics located in the seat with electrical energy, or to query the signals and transmit control signals to these electronics.

The present invention may provide for a passive sensor for seat-occupancy detection to be located in the seat, which generates (converts) pressure exerted on the seat into a signal which is queried by a control device in a wireless manner and then received again as well. Especially the use of acoustic surface-wave components such as a SAW or planar LC-resonators, may allow an embodiment as a passive sensor, which does not require an energy supply of its own.

Figure 1:
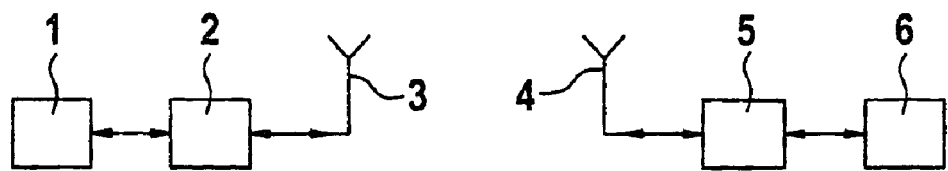
FIG. 1 shows a block diagram of a device according to the present invention.

FIG. 1 shows a block diagram of a device for seat-occupancy detection according to an example embodiment of the present invention. A control device includes a processor 1 which, via a data input/output, is connected to a master-/slave device 2 at whose input/output an antenna 3 is connected in turn. Via additional lines, which are not shown, processor 1 is connected to other components so as to perform its control function. In this case, a sensor according to the present invention includes an antenna 4 which is connected to an input/output of a sensing element 5, which in turn is connected to a reflector via an input/output, this reflector bearing the reference numeral 6. Here, the sensor according to the present invention is configured as a purely passive sensor, so that the electric energy for operating the sensor is obtained solely through the received electrical signal.

Using master/slave station 2 and antenna 3, the control device transmits a high-frequency pulse in predefined intervals, which is received by antenna 4 and supplies electric energy to sensing element 5, so that sensing element 5 may use it to perform a measurement. Sensing element 5 is configured such that the compressive load modulates the received electric energy via sensing element 5 in such a manner that conclusions may be drawn regarding the pressure or the corresponding deformation of the sensor element. In order to also retransmit this modulated signal again, reflector 6 is provided, namely via a delay line which ensures that the signal is also retransmitted to antenna 3, and thus to the control device, via antenna 4. Therefore, an emitted pulse from antenna 3 is modulated and retransmitted again by the sensor according to the present invention, so that, on the basis of this is modulation, the control device with processor 1 is able to draw conclusions regarding the pressure exerted on the sensor.

With the aid of an oscillator, master/slave device 2 generates a high-frequency pulse when master/slave device 2 receives a corresponding signal from processor 1 requesting it to emit this initial pulse. The power of the high-frequency pulse is set such that the signal retransmitted by the sensor is still able to be received, that is, it has enough power for master/slave station 2 to detect it in the noise. Master/slave device 2 then filters, amplifies and down-converts the received signal to an intermediate frequency in order to digitize it there. The received signal is then transmitted as data stream to processor 1 which performs the demodulation of the received signal in order to thereby detect the pressure impact on the seat.

Master/slave device 2 may use correlation, for instance, as the receiving technology, so that a weak signal is able to be filtered out from the noise. Since the pressure causes a corresponding change in the signal-propagation time in the sensor according to the present invention, a propagation-time measurement may be used to determine the pressure. If a plurality of sensors is used, the reflected signal is able to be appropriately encoded by a special configuration of the reflector, so that the identification is possible when reading out a plurality of sensors.

Figure 2:
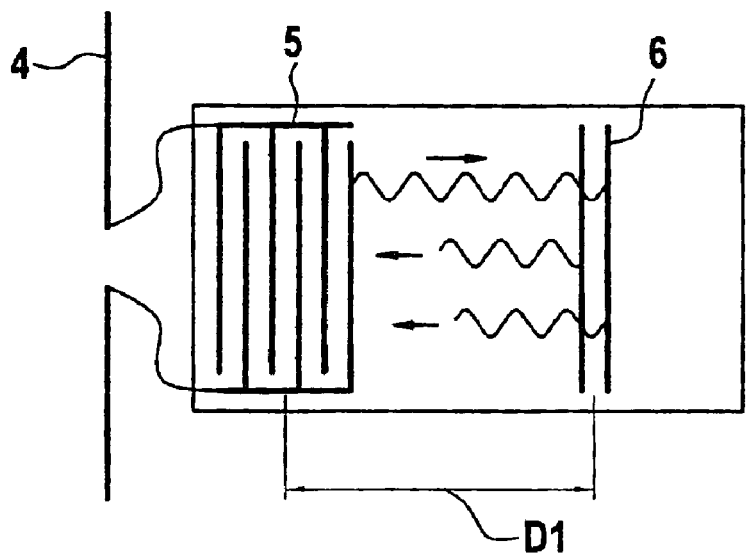
FIG. 2 shows a schematic representation of a sensor according to the present invention.

In a first example embodiment, FIG. 2 will now show the configuration of the sensor according to the present invention. Antenna 4 is configured as a dipole antenna in this case and connected via lines to an interdigital structure 5 as the sensing element. Interdigital structure 5 is located on a piezoelectric substrate at a distance D1 from reflector 6. Thus, an acoustic surface-wave element is described here. Such sensors are based on the change in the properties, that is, the propagation speed of an acoustic surface wave on a piezoelectric substrate, in this case having a typical size of $3*3*0.5$ mm$^2$.

By applying pressure, or by the deformation of the substrate, different delay times of the surface wave result. Therefore, a wireless delay line is realized by reflector 6, so that, in response to a surface-wave packet being electrically energized by interdigital transducer 5, the wave packet rearrives at interdigital transducer 5 following a delay time that is characterized by double the interval between interdigital transducer 5 and reflector 6. The function of interdigital transducer 5, and that of the reflector as well, is based on the electro-acoustical coupling between mechanical deformation of the substrate and the electric charges on the metal-plated structures of interdigital transducer 5 or reflector 6 that is made possible by the piezoelectric effect.

If interdigital transducer 5 is connected to antenna 4, as is the case here, the excitation may be performed by a high-frequency pulse received via antenna 4, which, after passing through the distance to reflector 6 and back to interdigital transducer 5, is emitted again by antenna 4. This high-frequency pulse may be received by the same device that sent the excitation pulse, namely the control device. The control device with processor 1, master/slave device 2 and antenna 3, thus performs the function of a transceiver.

By a configuration of reflector 6 the reflected signal may be encoded, to be utilized for identification when reading out a plurality of sensors at the same time. The propagation time of the signal varies according to the pressure or the deformation to which the piezoelectric substrate is subjected, so that a wireless pressure sensing may occur. As an option, the substrate may also be applied on a carrier structure for this purpose, for example, a platelike carrier structure which deforms in accordance with an applied pressure. The sensor, possibly together with the carrier and antenna, such as a wire antenna, may be integrated in a seat of a vehicle in such a manner that pressure is exerted on the sensor when a seat is being occupied. This makes it possible to detect the occupancy of a seat in a wireless manner and, as the case may be, the type of occupancy as well, that is, adult, child or object.

Figure 3:
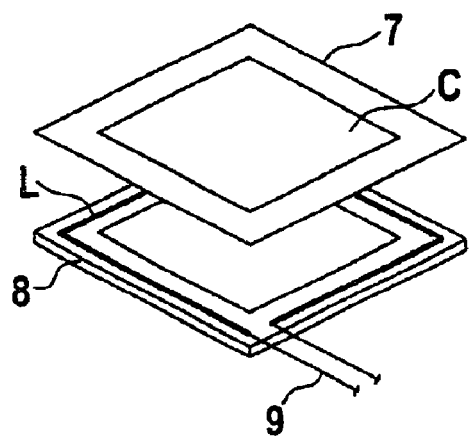
FIG. 3 shows a second schematic representation of a sensor according to the present invention.
Figure 4:
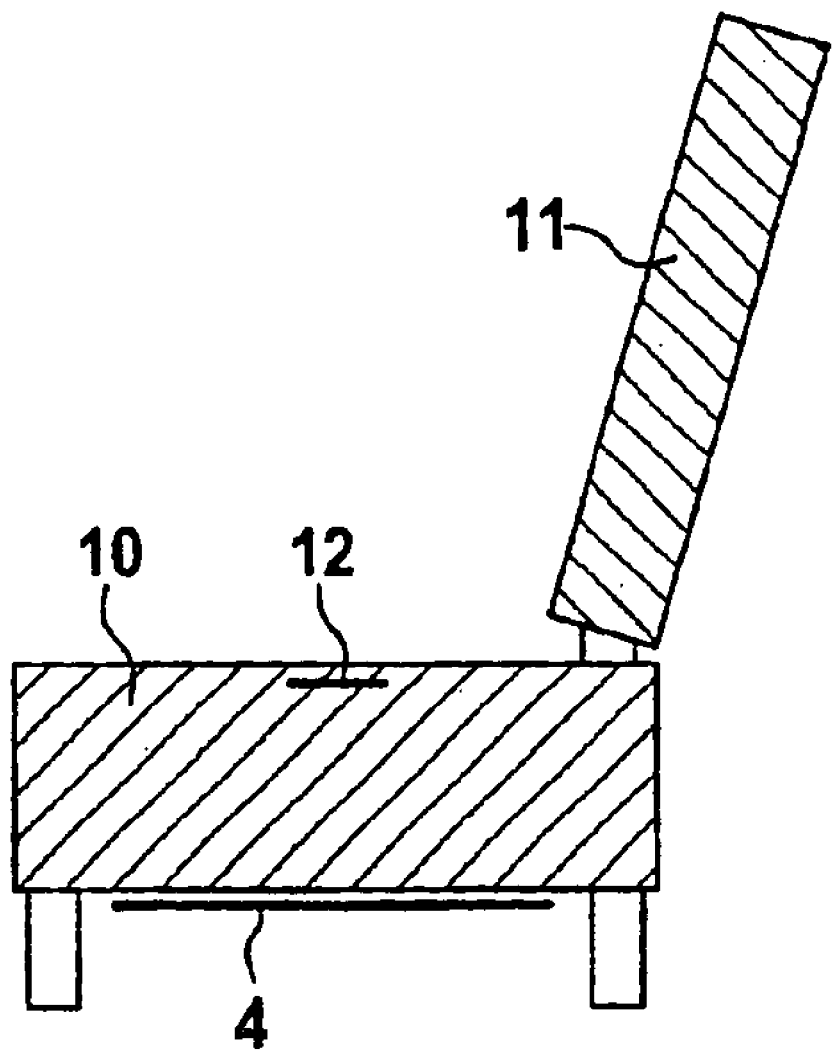
FIG. 4 shows the configuration of a sensor according to the present invention inside the vehicle seat.

In addition to SAW sensors, it is also possible, as shown in FIG. 3, to use wirelessly readable planar LC-resonators, i.e., electrical resonators. Such resonators include a resonant circuit formed by a coil, denoted by reference sign L in FIG. 3, and a capacitor, denoted by reference sign C in FIG. 3, which are applied on a ceramic board in thick-film technology. An antenna, which is connected via line 9, is used to excite the resonator. The antenna via which an electromagnetic excitation field is emitted, is used to excite the resonator. Conclusions may be drawn regarding the resonant frequency of the LC resonator via the measurement of the antenna impedance. If the resonator is formed from a rigid ceramic plate, which constitutes the resonator coil, and a plate of a capacitor and a superposed flexible foil onto which the second plate of the capacitor is imprinted, the pressure on the flexible foil causes a change in the resonant frequency. Thus, the pressure may be inferred via the measurement of the resonant frequency. This is shown in FIG. 3, since in this case the foil is denoted by reference numeral 7 and the ceramic plate by 8.

FIG. 3 shows how the sensor according to the present invention together with its antenna is located in a vehicle seat 11. The sensor according to the present invention, possibly with a supporting plate 12, is arranged below the surface of a flexible seat upholstery 10. Antenna 4 is located on the underside of the seat and configured in accordance with the received frequency.

What is claimed is:

1. A sensor for seat-occupancy detection, the sensor comprising:
    at least one sensing element which generates a signal as a function of pressure exerted on a seat;
    wherein the at least one sensor is configured as a passive sensor; and wherein the at least one sensing element is configured as an electric resonator.
2. The sensor of claim 1, wherein the at least one sensor has at least one first antenna for a wireless querying of the signal.
3. The sensor of claim 1, wherein the at least one sensing element is configured as a surface-type filter.
4. The sensor of claim 1, wherein the at least one sensor includes an array of sensing elements.

5. A sensor for seat-occupancy detection, the sensor comprising:
- at least one sensing element which generates a signal as a function of pressure exerted on a seat;
- wherein the at least one sensor is configured as a passive sensor; and
- wherein the at least one sensing element is configured in an interdigital structure.

6. A sensor for seat-occupancy detection, the sensor comprising:
- at least one sensing element which generates a signal as a function of pressure exerted on a seat;
- wherein the at least one sensor is configured as a passive sensor;
- wherein the at least one sensor has at least one first antenna for a wireless querying of the signal; and
- wherein the at least one first antenna is tuned to a high-frequency signal.

7. A control device for a sensor for seat-occupancy detection, the control device comprising:
- an antenna for emitting a query to a passive sensor, the passive sensor emitting a signal as a function of pressure exerted on a seat, the antenna configured to receive the signal, wherein the at least one sensing element is configured as an electric resonator.

8. A device for seat-occupancy detection, the device comprising:
- a sensor including at least one sensing element which generates a signal as a function of pressure exerted on a seat, the at least one sensor being configured as a passive sensor, wherein the at least one sensing element is configured as an electric resonator; and
- a control device which includes an antenna for emitting a query to the sensor and for receiving the signal.

* * * * *